(12) United States Patent
Sakamoto

(10) Patent No.: US 6,685,282 B2
(45) Date of Patent: Feb. 3, 2004

(54) METHOD FOR OPERATING REFERENCE SPEED IN ANTI-LOCK BRAKING CONTROL AND ANTI-LOCK BRAKING SYSTEM

(75) Inventor: Tadashige Sakamoto, Yokosuka (JP)

(73) Assignee: Bosch Automotive Systems Corporation, Tokyo (JP)

(\*) Notice: Subject to any disclaimer, the term of this patent is extended or adjusted under 35 U.S.C. 154(b) by 0 days.

(21) Appl. No.: 10/231,205

(22) Filed: Aug. 29, 2002

(65) Prior Publication Data

US 2003/0122419 A1 Jul. 3, 2003

(51) Int. Cl.⁷ .................................................. B60T 8/74
(52) U.S. Cl. .................. 303/170; 303/137; 303/113.1; 303/122.02
(58) Field of Search .................................. 303/166, 183, 303/186, 170, 127.02, 9.64, 137, 113.1, 20; 701/79, 78, 70, 71, 72

(56) References Cited

U.S. PATENT DOCUMENTS

| | | | |
|---|---|---|---|
| 4,358,164 A | 11/1982 | Bleckmann et al. | |
| 4,435,768 A | * 3/1984 | Arikawa | ........................ 701/79 |
| 5,566,094 A | 10/1996 | Kojima et al. | |
| 5,719,770 A | 2/1998 | Matsuno | |
| 6,089,682 A | * 7/2000 | Ishikawa et al. | ............ 303/163 |
| 6,466,855 B2 | * 10/2002 | Yamaguchi | ................... 701/70 |

FOREIGN PATENT DOCUMENTS

| | | |
|---|---|---|
| EP | 0348072 A2 | 12/1989 |
| EP | 0656291 A1 | 6/1995 |

\* cited by examiner

*Primary Examiner*—Christopher P. Schwartz
*Assistant Examiner*—Melanie Torres
(74) *Attorney, Agent, or Firm*—Priest & Goldstein, PLLC

(57) ABSTRACT

When a method for operating a reference speed judges that an ABS control is being executed, the method judges whether the ABS control is being executed to a front wheel or not. When the method judges that the ABS control is not executed to the front wheel, the method considers that the lifting of a rear wheel does not occur, and makes the reference speed follow the fastest wheel speed $V_RH$. When the method judges that the ABS control is being executed to the front wheel, and further judges that a reference body deceleration is a predetermined value or more, the method considers that the lifting of the rear wheel has occurred, and makes the reference speed follow a speed $V_RM$. The speed $V_RM$ is a wheel speed calculated in accordance with the following formula: $V_RM = \alpha V_RL + (1-\alpha) V_RH$ $(0 < \alpha < 1)$, where a character $V_RL$ indicates the slowest wheel speed, and a character $\alpha$ indicates a default.

9 Claims, 7 Drawing Sheets

METHOD FOR OPERATING REFERENCE SPEED IN ANTI-LOCK BRAKING CONTROL AND ANTI-LOCK BRAKING SYSTEM

BACKGROUND OF THE INVENTION

1. Field of the Invention

The present invention relates to a method for operating a reference speed in an anti-lock braking control of an automobile having two or more wheels, and an anti-lock braking control technique on the basis of the reference speed.

2. Description of the Related Art

As a brake control unit for a vehicle such as a two-wheeled vehicle, an anti-lock braking system (ABS) is publicly known which prevents the elongation of a braking distance of the vehicle or the impossibility of the control of the traveling direction of the vehicle with its steering wheel owing to the slipping of the vehicle caused by the locking of a wheel at the time of quick braking or at the time of braking on a slippery road surface.

The anti-lock braking system performs a brake control in order not to lock wheels by detecting the rotational speeds of the wheels at the time of the braking caused by a certain braking operation, and performs the brake control by performing the pressure intensifying control or the pressure reducing control of the brake operation hydraulic pressures to the wheel cylinders of the vehicle on the basis of the detected rotational speeds. To put it concretely, when a wheel is going to be locked, the anti-lock braking system repeats the control of decompressing the brake operation hydraulic pressure to each of the wheel cylinders and the control of pressurizing the brake operation hydraulic pressure according to the wheel rotational speeds to prevent the locking of the wheel. The control of decompressing the brake operation hydraulic pressure is performed by opening the pressure reducing electromagnetic valve on the communicating path of each of the wheel cylinders and each of reservoirs to feed a part of the brake operating liquid, which is fed from each of the master cylinders to each of the wheel cylinders, to each of the reservoirs to decompress the brake operation hydraulic pressure to each of the wheel cylinders. The control of pressurizing the brake operation hydraulic pressure is performed by closing the pressure reducing electromagnetic valve with the brake operating liquid fed from the master cylinder to the wheel cylinder. Moreover, the brake operating liquid fed to each of the reservoirs is compulsively fed to each of the master cylinders by a pump.

When the pressure intensifying control and the pressure reducing control of the brake operation hydraulic pressures to each of the wheel cylinders is performed on the basis of the rotational speed of each of the wheels in the anti-lock braking control, control variables such as acceleration and deceleration of the wheels, a slip ratio, a pseudo car body speed and reference body deceleration are operated by an operation block in an electric control unit (ECU) in the anti-lock braking system. Then, a control block in the ECU performs a brake control in order not to lock the wheels by performing the pressure intensifying control and the pressure reducing control of the brake operation hydraulic pressures to each of the wheel cylinders on the basis of the operated control variables.

The slip ratio, one of the control variables, can be operated from the wheel speed of each of the wheels and a car body speed. When the car body speed and the wheel speed are equal, the slip ratio is 0%. However, the slip ratio becomes larger as the difference between them becomes larger at the time of braking, and it becomes 100% when the wheel is locked before the stop of the car body. However, because the actual speed of the car body cannot be measured, when the slip ratio is operated, it is general that a reference body speed is operated and the slip ratio is operated by supposing the operated reference speed as the car body speed.

For example, in a motorcycle, the reference speed is generated from the wheel speed of an undriven wheel, i.e. the front wheel of the motorcycle, at the time when the anti-lock braking control of the motorcycle is not performed. The reason why the reference speed is generated from the wheel speed of the undriven wheel is that, first, in the state in which the driving wheel of the motorcycle is coupled with an engine, the moment of the inertia of the undriven wheel is sufficiently smaller than that of the driving wheel and is more sensitive to changes of braking torque, and consequently, at an initial step at the time of braking, the reference speed generated from the undriven wheel (front wheel) is closer to the car body speed at that time. Moreover, because the rear wheel being the driving wheel has the possibility of a rapid slip at the time of acceleration, the reference speed generated on the basis of the wheel speed of the front wheel is closer to the actual car body speed.

On the contrary, at the time of the anti-lock braking control, the reference speed having a larger value among the two values of the reference speeds generated on the basis of each of the wheel speeds of the front wheel and the rear wheel (driving wheel), namely the reference speed generated on the faster wheel speed among the wheel speeds of the front wheel and the rear wheel, is selected. The selection is generally called as the so-called select-high (or high-select), and is a method for operating a reference speed based on a publicly known technical basis. The method is regarded as the most effective method for approximating the progress of the reference speed to the actual car body speed to grasp the slip ratio as accurately as possible.

Now, particularly in a motorcycle, a phenomenon easily occurs which the rear wheel of the motorcycle floats at the time of braking. Among motorcycles, a vehicle having a larger ratio of the height of the center of gravity of the vehicle to a distance between the wheel shafts of the front wheel and the rear wheel has the inclination that the rear wheel of the vehicle easily floats. Then, when only the front wheel of such a motorcycle is braked while traveling on a road surface having a large coefficient of friction (the so-called high $\mu$ road surface), the rear wheel of the motorcycle easily floats in the air. From the point of view of achieving the safety of a traveling vehicle, also, it is desired to prevent such lifting of the rear wheel by detecting the lifting of the rear wheel to perform, for example, a suitable brake control of the front wheel.

However, for example, if braking is performed only to the front wheel and the rear wheel floats during the anti-lock braking control of the front wheel, the lifting of the rear wheel removes the ground resistance to the rear wheel to decrease the deceleration of the rear wheel rapidly. Consequently, if the anti-lock braking control is executed on the basis of the reference speed operated by following the wheel speed of the rear wheel selected in accordance with the above-mentioned select-high, the reference speed becomes higher than the actual car body speed at the time of the lifting of the rear wheel. Thereby, the situation is judged to be one in which a wheel is slipping relatively. Then, although the wheels are not slipping, a pressure reducing control of a wheel cylinder is performed. Consequently, the problem in which the braking feeling of a brake is spoiled is produced.

Accordingly, it is possible to prevent the situation in which a reference speed becomes higher than an actual car body speed by taking a basis on the reference speed operated to follow the wheel speed of the front wheel selected by a method, the so-called select-low, to select the value of a reference speed being a smaller one among the values of the reference speeds of the front wheel and the rear wheel at the time of the lifting of the rear wheel. However, in this case, the selected reference speed becomes lower than the actual car body speed in turn. Consequently, there is the possibility of occurring the problem in which extreme changes of vehicle stability occur in the time of traveling on a low $\mu$ road surface particularly.

SUMMARY OF THE INVENTION

The present invention was made in consideration of such situations. It is an object of the present invention to realize an anti-lock braking control having little possibility of decreasing the vehicle stability on a low $\mu$ road surface while decreasing the degree of the deterioration of the braking feeling of a brake which deterioration is produced by the conventional uniform setting of a reference speed to a wheel speed in accordance with the selection of the select-high at the time of the lifting of a rear wheel of the vehicle.

For achieving the object, a first aspect of the present invention, is a method for operating a reference speed in an anti-lock braking control of an automobile having two or more wheels, which method comprises the steps of: supposing a wheel speed of a wheel rotating at a slowest rotational speed to be $V_RL$; supposing a wheel speed of a wheel rotating at a fastest rotational speed to be $V_RH$; supposing a fixed default to be $\alpha$; and operating the reference speed to follow a wheel speed $V_RM$ calculated in accordance with a following formula (1).

$$V_RM = \alpha V_RL + (1-\alpha)V_RH \quad (0<\alpha<1) \qquad (1)$$

As described above, if the anti-lock braking control is executed on a reference speed operated in accordance with the select-high, namely a reference speed operated to follow the wheel speed $V_RH$ of a wheel rotating at the highest rotational speed, the problem of spoiling the braking feeling of a brake at the time of the lifting of the rear wheel is produced. On the other hand, if the anti-lock braking control is executed on a reference speed operated in accordance with the select-low, namely a reference speed operated to follow a wheel speed $V_RL$ of a wheel rotating at the lowest rotational speed, the reference speed becomes lower than the actual car body speed at the time of traveling on a low $\mu$ road surface particularly, in turn. Then, there is the possibility of generating the problem such that extreme changes occur in the aspect of the vehicle stability.

In the above-mentioned formula (1), the default $\alpha$ is fixed to a value within a range being larger than 0 and smaller than 1. That is, the wheel speed $V_RM$ becomes a wheel speed between the wheel speed $V_RH$ of the wheel rotating at the fastest speed and the wheel speed $V_RL$ of the wheel rotating at the slowest speed. Consequently, for example, if the value of the default $\alpha$ is fixed to be 0.5, the wheel speed $V_RM$ becomes a wheel speed right in the middle between the wheel speed $V_RH$ of the wheel rotating at the fastest speed and the wheel speed $V_RL$ of the wheel rotating at the slowest speed. Then, if the value of the default $\alpha$ is made to be larger than 0.5, the wheel speed $V_RM$ becomes a wheel speed closer to the wheel speed $V_RH$ of the wheel rotating at the fastest speed. And if the value of the default $\alpha$ is made to be smaller than 0.5, the wheel speed $V_RM$ becomes a wheel speed closer to the wheel speed $V_RL$ of the wheel rotating at the slowest speed.

In such a way, the value of the default $\alpha$ is fixed to be an arbitrary value within the range of $0<\alpha<1$, and the reference speed is made to follow the wheel speed $V_RM$ calculated in accordance with the formula (1). Thereby, it becomes possible to approximate the reference speed at the time of the lifting of the rear wheel to the actual car body speed more closely. Incidentally, because the easiness of the lifting of a rear wheel differs according to a ratio of the height of the center of gravity of a vehicle and a distance between the wheel shafts of the front wheel and the rear wheel, different values of the default $\alpha$ are fixed according to the easiness of the lifting of vehicles, and accordingly the value of the default $\alpha$ is obtained by experiments or the like.

Thereby, according to the method for operating a reference speed of the first aspect of the present invention, because the reference speed at the time of the lifting of a rear wheel can be approximated to an actual car body speed more closely by making the reference speed follow the wheel speed $V_RM$, the operation and the advantage of the realization of an anti-lock braking control having the following feature can be obtained. That is, the feature is that the anti-locking braking control has little possibility of decreasing the vehicle stability at the time of traveling on a low $\mu$ road surface while decreasing the degree of the deterioration of the braking feeling of a brake which deterioration is produced by the conventional uniform setting of a reference speed to a wheel speed by the selection in accordance with the select-high at the time of the lifting of the rear wheel of the vehicle.

A second aspect of the present invention is an anti-lock braking control method of an automobile having two or more wheels, which method comprises the step of operating a reference speed in accordance with the method for operating the reference speed of the first aspect.

According to the anti-locking braking control method of the second aspect of the present invention, the above-mentioned operation and the advantage of the first aspect of the present invention can be obtained in the anti-locking braking control method.

A third aspect of the present invention is an anti-lock braking control method according to the second aspect, which method further comprises the steps of: operating the reference speed to follow the wheel speed $V_RH$ during an anti-lock braking control; noticing reference body deceleration calculated on a basis of the reference speed to judge that lifting of a rear wheel from a supporting surface has occurred if the reference body deceleration is equal to a predetermined value or more during the anti-lock braking control of a front wheel; and operating the reference speed to follow the wheel speed $V_RM$ at a time of the lifting of the rear wheel.

According to results of driving tests and the like and the characteristics of the configurations of the bodies of motorcycles, it is known that a rear wheel is easy to float in the case where car body deceleration exists in a region where the car body deceleration exceeds a predetermined value. Accordingly, by noticing reference body deceleration calculated from a reference speed made to follow the select-high during an anti-lock braking control of the front wheel, it can be presumed that the lifting of the rear wheel easily occurs when the reference body deceleration is equal to the predetermined value or more.

Thereby, according to the anti-lock braking control method of the third aspect of the present invention, in addition to the operation and advantage of the second aspect of the present invention, the operation and the advantage can be obtained in which it is possible to deal with the lifting of the rear wheel appropriately and make the reference speed, which is made to follow the wheel speed $V_RH$ ordinarily, follow the wheel speed $V_RM$ precisely when the possibility of the lifting of the rear wheel is high, because it is considered that the lifting of the rear wheel has occurred and then it is judged that the lifting of the rear wheel has occurred in the state in which the lifting of the rear wheel can be pressured to occur easily.

A fourth aspect of the present invention is an anti-lock braking control method according to the second or the third aspect, wherein a value of the default α is variable according to a state of the anti-lock braking control.

As described above, because the value of the default α is variable according to the state of the anti-lock braking control, it becomes possible to set the wheel speed $V_RM$, which the reference speed is made to follow, to be the most appropriate wheel speed according to car body speeds and the state of each wheel under various brake control conditions.

Thereby, according to the anti-lock braking control method of the fourth aspect of the present invention, in addition to the operation and the advantage of the second or the third aspect, the operation and the advantage can be obtained in which it is possible to realize the anti-lock braking control having little possibility of the decrease of the vehicle stability at the time of traveling on the low μ road surface while reducing the degree of the deterioration of the braking feeling of a brake, which deterioration is caused by making the reference speed follow the wheel speed selected in accordance with the select-high, under various brake control conditions, because it becomes possible to set the wheel speed $V_RM$, which the reference speed is made to follow, to be the most suitable wheel speed.

A fifth aspect of the present invention is an anti-lock braking control method according to any one of the second to the fourth aspects, wherein the reference speed is operated to follow a wheel speed of an undriven wheel while the anti-lock braking control is not executed.

Thereby, according to the anti-lock braking control method of the fifth aspect of the present invention, in addition to the operation and the advantage of any one the second to the fourth aspects, because the reference speed generated from the wheel speed of the undriven wheel is closer to the actual car body speed when the anti-lock braking control is not performed as described above, the operation and the advantage can be obtained in which the reference speed can be set to the closest value to the car body speed when the anti-lock braking control is not performed.

A sixth aspect of the present invention is an anti-lock braking system of an automobile having two or more wheels, which automobile is equipped with wheel speed sensors generating rotational speed information of the wheels and an ECU including means for calculating wheel speeds on a basis of the rotational speed information of the wheels input from the wheel speed sensors to operate a reference speed on a basis of the wheel speeds for operating slip ratios and acceleration and deceleration of the wheels on a basis of the reference speed, wherein the ECU includes means for operating the reference speed to follow a wheel speed $V_RM$ calculated in accordance with the above-mentioned formula (1) by supposing a wheel speed of a wheel rotating at a slowest rotational speed to be $V_RL$, and supposing a wheel speed of a wheel rotating at a fastest rotational speed to be $V_RH$, and further supposing a fixed default to be α.

According to the anti-lock braking system of the sixth aspect of the present invention, the operation and the advantage similar to those of the above-mentioned second aspect of the present invention can be obtained.

A seventh aspect of the present invention is an anti-lock braking system according to the sixth aspect, wherein the ECU operates the reference speed to follow the wheel speed $V_RH$ during an anti-lock braking control, and the ECU notices reference body deceleration calculated on a basis of the reference speed to judge that lifting of a rear wheel from a supporting surface has occurred if the reference body deceleration is equal to a predetermined value or more during the anti-lock braking control of a front wheel, and further the ECU operates the reference speed to follow the wheel speed $V_RM$ at a time of the lifting of the rear wheel.

According to the anti-lock braking system of the seventh aspect of the present invention, the operation and the advantage similar to those of the above-mentioned third aspect of the present invention can be obtained.

An eighth aspect of the present invention is an anti-lock braking system according to the sixth or the seventh aspect, wherein a value of the default α is variable according to a state of the anti-lock braking control.

According to the anti-lock braking system of the eighth aspect of the present invention, the operation and the advantage similar to those of the above-mentioned fourth aspect of the present invention can be obtained.

A ninth aspect of the present invention is an anti-lock braking system according to any one of the sixth to the eighth aspects, wherein the ECU operates the reference speed to follow a wheel speed of an undriven wheel while the anti-lock braking control is not executed.

According to the anti-lock braking system of the ninth aspect of the present invention, the operation and the advantage similar to those of the above-mentioned fifth aspect of the present invention can be obtained.

A tenth aspect of the present invention is a reference speed operation program for making a computer installed in an ECU execute an operation of a reference speed in an anti-lock braking system of an automobile having two or more wheels, which automobile is equipped with wheel speed sensors generating rotational speed information of the wheels and the ECU including means for calculating wheel speeds on a basis of the rotational speed information of the wheels input from the wheel speed sensors to operate the reference speed on a basis of the wheel speeds for operating slip ratios and acceleration and deceleration of the wheels on a basis of the reference speed, which program comprises the steps of: supposing a wheel speed of a wheel rotating at a slowest rotational speed to be $V_RL$; supposing a wheel speed of a wheel rotating at a fastest rotational speed to be $V_RH$; supposing a fixed default to be α; and operating the reference speed to follow a wheel speed $V_RM$ calculated in accordance with the above-mentioned formula (1).

According to the reference speed operation program of the tenth aspect of the present invention, the operation and the advantage similar to those of the above-mentioned first aspect of the present invention can be obtained. Moreover, the reference speed operation program can bring about the operation and the advantage similar to those of the above-mentioned first aspect to the anti-lock braking system equipped with the ECU capable of executing the reference speed operation program.

An eleventh aspect of the present invention is an anti-lock braking control program for making a computer installed in an ECU execute an anti-lock braking control in an anti-lock braking system of an automobile having two or more wheels, which automobile is equipped with wheel speed sensors generating rotational speed information of the wheels and the ECU including means for calculating wheel speeds on a basis of the rotational speed information of the wheels input from the wheel speed sensors to operate the reference speed on a basis of the wheel speeds for operating slip ratios and acceleration and deceleration of the wheels on a basis of the reference speed, which program comprises the steps of: supposing a wheel speed of a wheel rotating at a slowest rotational speed to be $V_RL$; supposing a wheel speed of a wheel rotating at a fastest rotational speed to be $V_RH$; supposing a fixed default to be $\alpha$; and operating the reference speed to follow a wheel speed $V_RM$ calculated in accordance with the above-mentioned formula (1).

According to the anti-lock braking control program of the eleventh aspect of the present invention, the operation and the advantage similar to those of the above-mentioned second aspect of the present invention can be obtained. Moreover, the anti-lock braking control program can bring about the operation and the advantage similar to those of the above-mentioned second aspect to the anti-lock braking system equipped with the ECU capable of executing the anti-lock braking control program.

A twelfth aspect of the present invention is an anti-lock braking control program according to the eleventh aspect, which program further comprises the steps of: operating the reference speed to follow the wheel speed $V_RH$ during an anti-lock braking control; calculating reference body deceleration on a basis of the reference speed; judging that lifting of a rear wheel from a supporting surface has occurred if the reference body deceleration is equal to a predetermined value or more during the anti-lock braking control of a front wheel; and operating the reference speed to follow the wheel speed $V_RM$ at a time of the lifting of the rear wheel.

According to the anti-lock braking control program of the twelfth aspect of the present invention, the operation and the advantage similar to those of the above-mentioned third aspect of the present invention can be obtained. Moreover, the anti-lock braking control program can bring about the operation and the advantage similar to those of the third aspect to the anti-lock braking system equipped with the ECU capable of executing the anti-lock braking control program.

A thirteenth aspect of the present invention is an anti-lock braking control program according to the eleventh or the twelfth aspect, which program further comprises the step of changing a value of the default $\alpha$ according to a state of the anti-lock braking control.

According to the anti-lock braking control program of the thirteenth aspect of the present invention, the operation and the advantage similar to those of the above-mentioned fourth aspect of the present invention can be obtained. Moreover, the anti-lock braking control program can brought about the operation and the advantage similar to those of the fourth aspect to the anti-lock braking system equipped with the ECU capable of executing the anti-lock braking control program.

A fourteenth aspect of the present invention is an anti-lock braking control program according to any one of the eleventh to the thirteenth aspects, which program further comprises the step of operating the reference speed to follow a wheel speed of an undriven wheel while the anti-lock braking control is not executed.

According to the anti-lock braking control program of the fourteenth aspect of the present invention, the operation and the advantage similar to those of the above-mentioned fifth aspect of the present invention can be obtained. Moreover, the anti-lock braking control program can bring about the operation and the advantage similar to those of the fifth aspect to the anti-lock braking system equipped with the ECU capable of executing the anti-lock braking control program.

According to the present invention, an anti-lock braking control can be realized which has little possibility of decreasing the vehicle stability at the time of traveling on a low $\mu$ road surface while decreasing the degree of the deterioration of braking feeling of a brake which deterioration is produced by the conventional uniform setting of a reference speed to a wheel speed in accordance with the selection of the select-high at the time of the lifting of a rear wheel of the vehicle.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

In the following, preferred embodiments of the present invention are described on the basis of the attached drawings.

Figure 1:
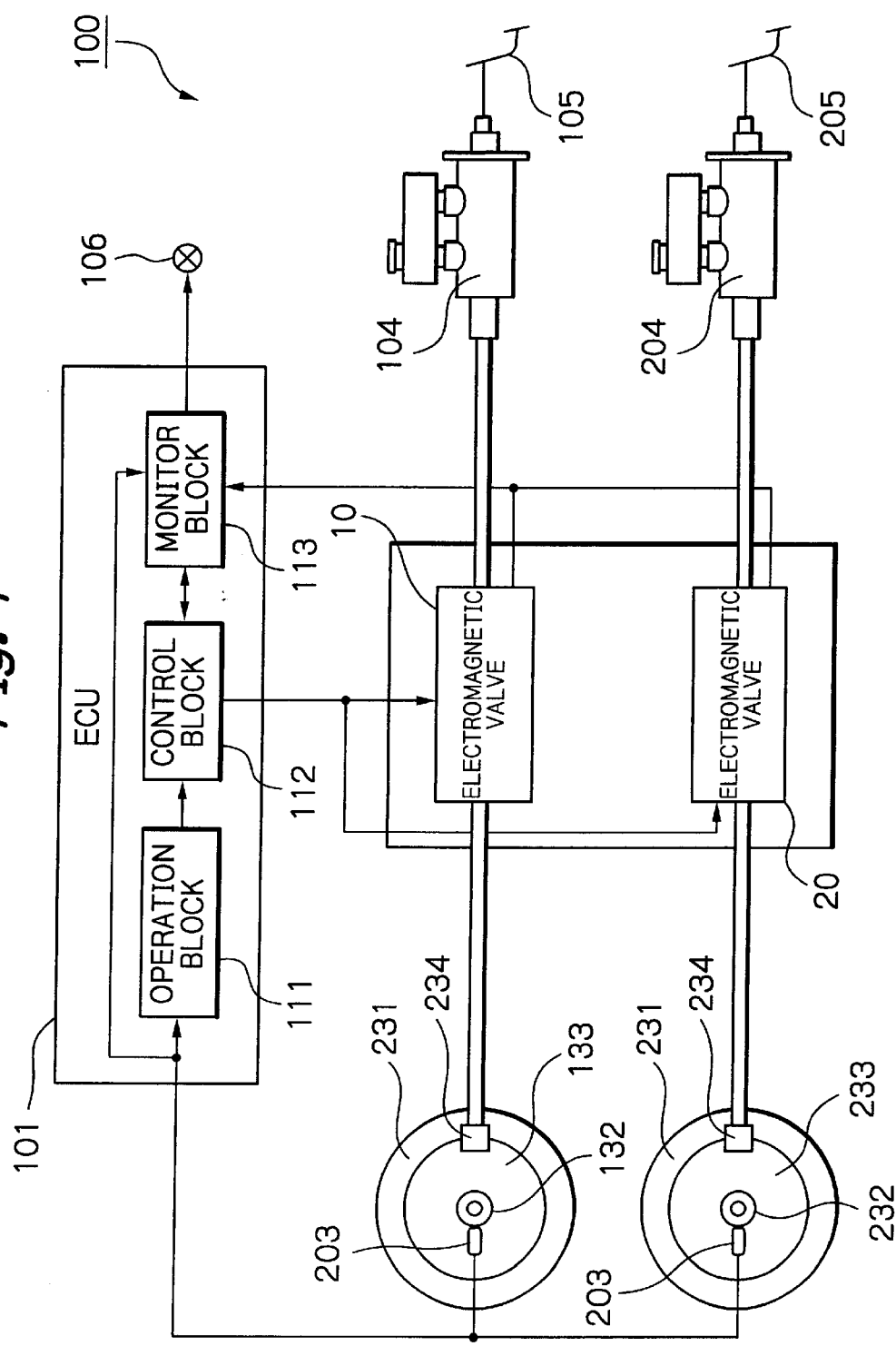
FIG. 1 is a schematic block diagram showing the system configuration of the anti-lock braking system of a motorcycle according to the present invention.

First, an anti-lock braking system of a motorcycle according to the present invention is described. FIG. 1 is a schematic block diagram showing the system configuration of the anti-lock braking system of the motorcycle according to the present invention.

The basic configuration of the anti-lock braking system 100 of the motorcycle is composed of a front wheel wheel speed sensor 103, a rear wheel wheel speed sensor 203, an electronic control unit (ECU) 101 and a hydraulic unit 102. The front wheel wheel speed sensor 103 is one generating an alternating current signal having a frequency proportional to a rotational speed of a front wheel 131 by detecting teeth of a front wheel gear 132 rotating together with the front wheel 131, or its equivalent. Moreover, similarly, the rear wheel wheel speed sensor 203 is one generating an alternating current signal having a frequency proportional to a rotational speed of a rear wheel 231 by detecting teeth of a rear wheel gear 232 rotating together with the rear wheel 231, or its equivalent.

The ECU 101 is equipped with an operation block 111 having an operation function which receives the alternating current signals transmitted from the front wheel wheel speed sensor 103 and the rear wheel wheel speed sensor 203, and which function operates wheel speeds of the front wheel 131 and the rear wheel 231 to calculate a slip ratio and the acceleration and deceleration of the wheels 131 and 231 on the basis of the operated wheel speeds. Moreover, the ECU 101 is equipped with a control block 112 having a control function which receives the slip ratio and the acceleration and the deceleration of the wheels 131 and 231 all of which have been calculated by the operation block 111, and which function generates a control instruction to a braking pressure by combining the received slip ratio and the acceleration and the deceleration of the wheels 131 and 231 logically to transmit the generated control instruction to the hydraulic unit 102. Moreover, the ECU 101 is equipped with a monitor block 113 having a system monitor function which performs the function checking of each component part and the whole system, and which function warns a driver with a warning lump 106 and a not shown warning buzzer if a defect is produced in a certain component part or the whole system and then stops the anti-lock braking function of the motorcycle to make the operation of the ordinary brake of the motorcycle possible.

The hydraulic unit 102 is disposed between a front wheel master cylinder 104 and a front wheel wheel cylinder 134, or between a rear wheel master cylinder 204 and a rear wheel wheel cylinder 234. The hydraulic unit 102 intensifies or reduces the braking pressures of the front wheel 131 and the rear wheel 231 directly or indirectly by controlling the opening or the closing of an electromagnetic valve for front wheel braking pressure controlling 10 and an electromagnetic valve for rear wheel braking pressure controlling 20 by receiving a control instruction from the ECU 101 in addition to intensifying and reducing the braking pressure to a front wheel brake disc 133 in accordance with a gripping force of a front wheel brake lever 105 and the braking pressure to a rear wheel brake disk 233 in accordance with a treading force of a rear wheel brake pedal 205.

Figure 2:
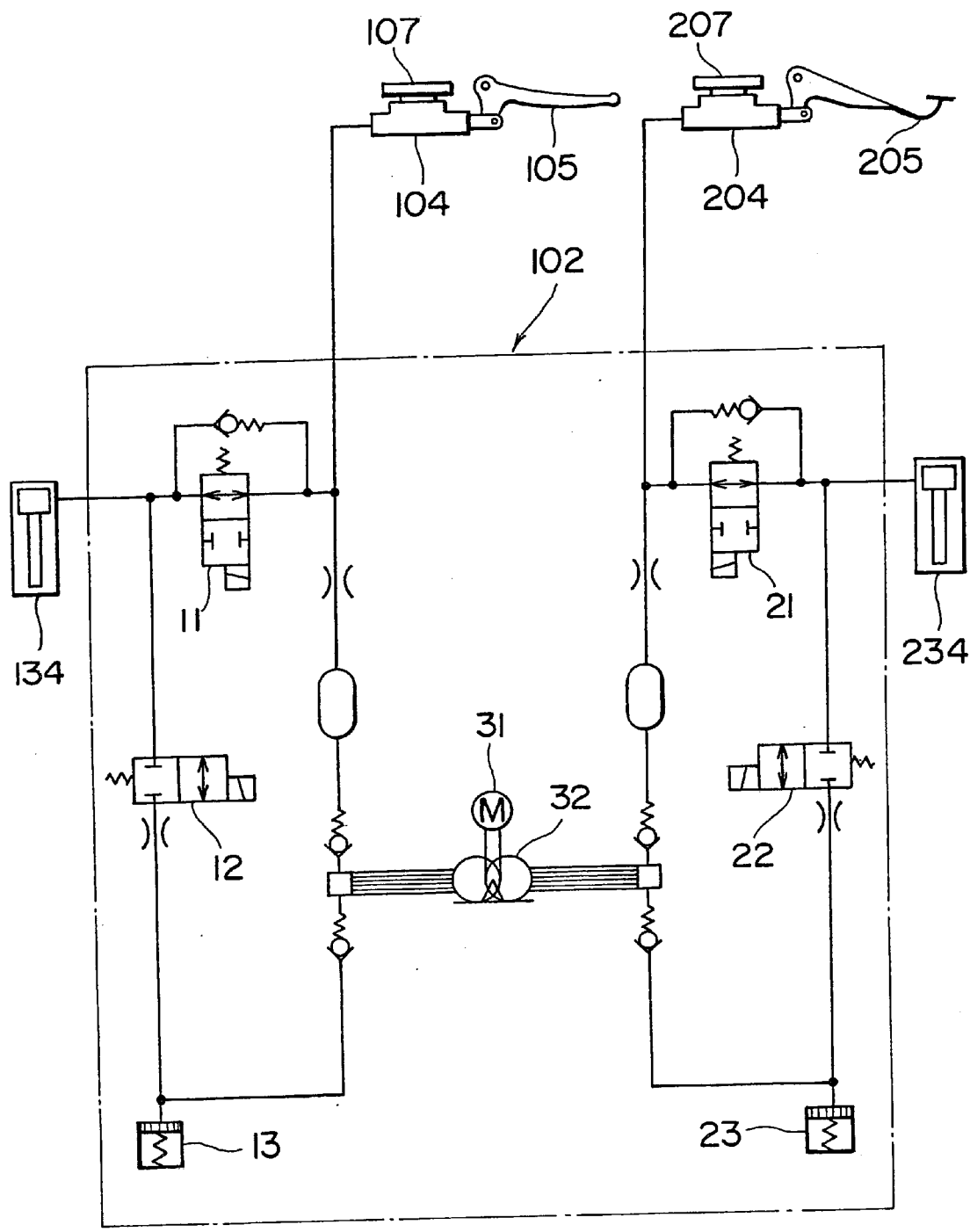
FIG. 2 is a schematic block diagram of the anti-lock braking system of the motorcycle according to the present invention.

FIG. 2 is a schematic block diagram of the anti-lock braking system 100 of the motorcycle according to the present invention.

The hydraulic unit 102 is equipped with two kinds of electromagnetic valves of a hydraulic pressure holding electromagnetic valve and a pressure reducing electromagnetic valve in each wheel. An EV valve 11 as the hydraulic pressure holding electromagnetic valve of the front wheel 131 and an EV valve 21 as the hydraulic pressure holding electromagnetic valve of the rear wheel 231 are electromagnetic valves being normally open (open at an ordinary time). On the other hand, an AV valve 12 as the pressure reducing electromagnetic valve of the front wheel 131 and an AV valve 22 as the pressure reducing electromagnetic valve of the rear wheel 231 are electromagnetic valves being normally closed (closed at an ordinary time). And, the EV valve 11 and the AV valve 12 perform a hydraulic control of the front wheel 131 at the time of an anti-lock braking control by combinations of their operations. Moreover, the EV valve 21 and the AV valve 22 perform a hydraulic control of the rear wheel 231 at the time of an anti-lock braking control by combinations of their operations.

A direct-current (DC) motor 31 operates a circulating current pump 32 by rotating an eccentric cam. At the time of the anti-lock braking control, the circulating current pump 32 sucks a brake operating liquid that has been supplied to a front wheel brake operating liquid reservoir 13 and a rear wheel brake operating liquid reservoir 23 to return to the sides of the front wheel master cylinder 104 and the rear wheel master cylinder 204, respectively. Thereby, the circulating current pump 32 secures the brake operating liquid in a reservoir tank 107 and a reservoir tank 207 so as not to be insufficient, or secures the spaces in the front wheel brake operating liquid reservoir 13 and the rear wheel brake operating liquid reservoir 23 for storing the brake operating liquid. The front wheel brake operating liquid reservoir 13 stores the brake operation hydraulic pressure, which was relaxed by the AV valve 12, of the front wheel wheel cylinder 134 temporarily, and the rear wheel brake operating liquid reservoir 23 stores the brake operation hydraulic pressure, which was relaxed by the AV valve 22, of the rear wheel wheel cylinder 234 temporarily.

In the anti-lock braking system 100, structured in such a way, of the motorcycle, all of the electromagnetic valves are in the state of turning off electricity at the time of the ordinary braking control, and then the brake operation hydraulic pressure generated by the front wheel master cylinder 104 is transmitted to the front wheel wheel cylinder 134 through the EV valve 11. Then, at the time of releasing the brake, the brake operating liquid returns to the front wheel master cylinder 104 through its reverse route. Similarly, the brake operation hydraulic pressure generated by the rear wheel master cylinder 204 is transmitted to the rear wheel wheel cylinder 234 through the EV valve 21. Then, at the time of releasing the brake, the brake operating liquid returns to the rear wheel master cylinder 204 through its reverse route.

Moreover, at the time of an anti-lock braking control, the locking of the front wheel 131 and the rear wheel 231 is prevented by performing the following control. Because the configurations and the operations on both sides of the front wheel 131 and the rear wheel 231 are basically the same, respectively, the configuration and the operation on the side of the front wheel 131 are exemplified to be described.

When the front wheel 131 is likely to be locked, the turning on of electricity is made by the control of the ECU 101 to the EV valve 11 and the AV valve 12. The EV valve 11 changes its normally open state to its closed state, and the AV valve 12 changes its normally closed state to its open state. By the closing of the EV valve 11 and the opening of the AV valve 12, the master cylinder pressure of the front wheel 131 and the wheel cylinder pressure of the front wheel 131 are isolated. The wheel cylinder pressure is reduced by the storing of the brake operating liquid into the front wheel brake operating liquid reservoir 13 temporarily through the AV valve 12. Moreover, electricity is also conducted to the DC motor 31 at the same time in this case, the brake operating liquid, which has been stored in the front wheel brake operating liquid reservoir 13 temporarily, is sucked by the circulating current pump 32 to be returned to the front wheel master cylinder 104. Then, the brake operation hydraulic pressure on the side of the front wheel wheel cylinder 134 is controlled to be reduced in the state of being completely isolated from the brake operation hydraulic pressure on the side of the front wheel master cylinder 104.

When the front wheel wheel cylinder pressure is made to be the most suitable pressure, the electricity to the AV valve 12 is turned off by the control of the ECU 101, and the AV valve 12 changes into its closed state. Then, by the closing of the AV valve 12, the front wheel wheel cylinder pressure and the front wheel brake operating liquid reservoir 13 are isolated, and the front wheel wheel cylinder pressure is kept. That is, by the closing of both of the EV valve 11 and the AV valve 12, the pressure on the side of the front wheel wheel cylinder 134 becomes the brake operation hydraulic pressure controlled by the ECU 101, and the pressure on the side of the front wheel master cylinder 104 becomes the brake operation hydraulic pressure pressurized by the brake lever 105. The pressures on both the sides are isolated from each other to be in a independent state.

When it becomes necessary to intensify the front wheel wheel cylinder pressure, the electricity to the EV valve 11 is turned off by the control of the ECU 101, and the EV valve 11 changes to its open state. Then, by the opening of the EV valve 11, the front wheel master cylinder pressure and the front wheel wheel cylinder pressure communicate with each other to be the same state at the time of ordinary braking. And then, by the brake operation hydraulic pressure pressurized with the brake lever 105, the brake operation hydraulic pressure to the front wheel wheel cylinder 134 intensifies.

In such a way, the anti-lock braking system 100 of the motorcycle performs the pressure reducing control, the pressure keeping control and the pressure intensifying control of the brake operation hydraulic pressures to the front wheel wheel cylinder 134 and the rear wheel wheel cylinder 234, namely the braking pressures to the front wheel 131 and the rear wheel 231, by the opening and the closing operations of the EV valve 11, the AV valve 12, the EV valve 21 and the AV valve 22.

Next, a description is given to a selection procedure of a wheel speed which a reference speed is made to follow in a procedure of an anti-lock braking control according to the present invention.

Figure 3:
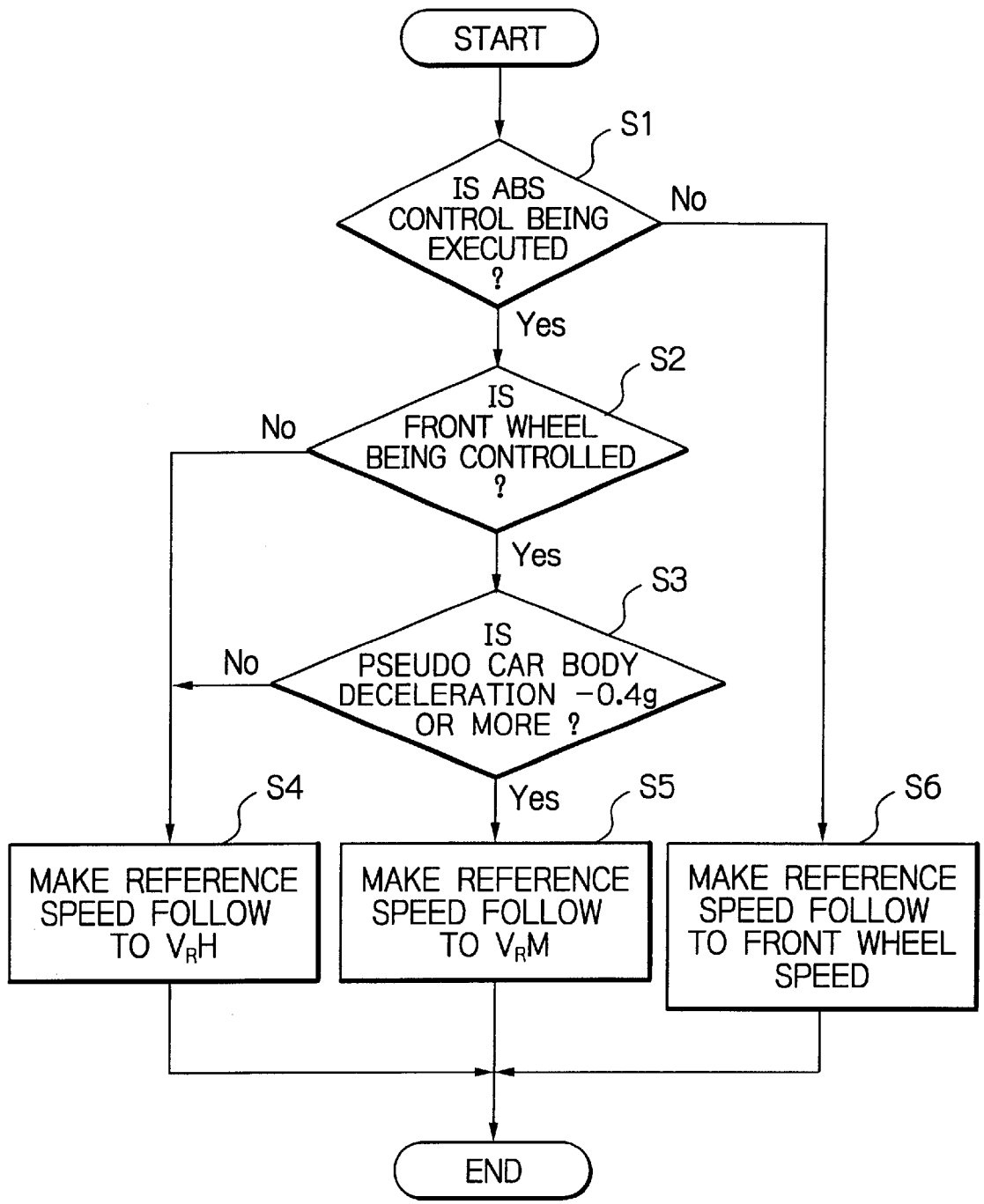
FIG. 3 is a flowchart showing a selection procedure of a wheel speed which a reference speed is made to follow in an anti-lock braking control procedure according to the present invention.

FIG. 3 is a flowchart showing the selection procedure of the wheel speed which the reference speed is made to follow in the procedure of the anti-lock braking control according to the present invention. The procedure shown in the flowchart is a procedure executed in the operation block 111 of the ECU 101 at a fixed cycle repeatedly. On the basis of a control variable for making the reference speed follow the wheel speed selected in the procedure, the anti-lock braking control is executed by performing the opening and the closing control of each electromagnetic valve in the hydraulic unit 102 and the like by the control block 112.

First, whether the anti-lock braking control is being executed or not (whether ABS control is being executed or not) is judged (Step S1). If it is judged that the anti-lock braking control is not being executed (No at Step S1), the reference speed is made to follow a front wheel wheel speed (Step S6). The procedure is performed because the wheel speed of an undriven wheel, namely the reference speed generated on the basis of the wheel speed of the front wheel 131, is closer to an actual car body speed at the time when the anti-lock braking control is not executed, as described above, and consequently the reference speed can be closest to the car body speed at the time when the anti-lock braking control is not executed.

On the contrarily, if it is judged that the anti-lock braking control is being executed (Yes at Step S1), it is judged next whether the anti-lock braking control is executed to the front wheel 131 or not (Step S2). The judgment step is a first step of the judgment whether the lifting of the rear wheel 231 has occurred or not. The step is performed because it can be considered that the lifting of the rear wheel 231 does not occur when the anti-lock braking control to the front wheel 131 is not being executed. Accordingly, because the probability of the occurrence of the lifting of the rear wheel 231 is low when it is judged that the anti-lock braking control of the front wheel 131 is not being executed (No at Step S2), it is considered that the lifting of the rear wheel 231 has not occurred, and the reference speed is made to follow the select-high, namely is made to follow the fastest wheel speed $V_R H$ (Step S4).

On the contrary, when it is judged that the anti-lock braking control of the front wheel 131 is being executed (Yes at Step S2), it is successively judged whether or not reference body deceleration is equal to −0.4 g or more (Step S3). This judgment step is a second step of the judgment whether the lifting of the rear wheel 231 has occurred or not. At the step, if the deceleration of the car body does not satisfy a predetermined deceleration value, it is considered that the lifting of the rear wheel 231 has not occurred. The predetermined deceleration is set to be −0.4 g in the present embodiment. Accordingly, because the probability of the occurrence of the lifting of the rear wheel 231 is low when it is judged that the reference body deceleration is not equal to −0.4 g or more (No at Step S3), it is considered that the lifting of the rear wheel 231 has not occurred, and the reference speed is made to follow the select-high, namely is made to follow the fastest wheel speed $V_R H$ (Step S4).

Incidentally, as described above, because a motorcycle has an inclination such that the lifting of the rear wheel 231 becomes easier to occur as a ratio of the height of its center of gravity and its distance between wheel shafts of the front wheel 131 and the rear wheel 231 is larger, the suitable value of the predetermined deceleration differs by the type of a car. Consequently, the predetermined deceleration is not limited to the deceleration value shown in the present embodiment.

On the contrary, because the probability of the occurrence of the lifting of the rear wheel 231 is high when it is judged that the reference body deceleration is equal to −0.4 g or more (Yes at Step S3), it is considered that the lifting of the rear wheel 231 has occurred, and the reference speed is made to follow a wheel speed $V_R M$, which will be described later, (Step S5).

The wheel speed $V_R M$ is a wheel speed calculated in accordance with the next formula (1).

$$V_R M = \alpha V_R L + (1-\alpha) V_R H \quad (0 < \alpha < 1) \tag{1}$$

Hereupon, the wheel speed $V_R L$ is the wheel speed of the slowest wheel, and the wheel speed $V_R H$ is the wheel speed of the fastest wheel. That is, in the motorcycle shown in the present embodiment, the wheel speed of either of the front wheel 131 and the rear wheel 231 is the wheel speed $V_R L$, and the wheel speed of the other is the wheel speed $V_R H$. The character α indicates a default in the rage of 0<α<1, and is set to be 0.5 in the present embodiment. Consequently, the wheel speed $V_R M$ is expressed by the next formula (2).

$$V_R M = 0.5 V_R L + 0.5 V_R H \quad (\alpha = 0.5) \tag{2}$$

That is, in the present embodiment, the wheel speed $V_R M$ is a wheel speed being right a middle speed between the wheel speed $V_RL$ and the wheel speed $V_RH$. Consequently, because the reference speed at the time of the lifting of the rear wheel 231 can be approximated to the actual car body speed by making the reference speed follow the wheel speed $V_RM$ when the rear wheel 231 floats, the anti-lock braking control becomes possible which has little possibility of the decrease of the vehicle stability at the time of traveling on a low μ road surface while decreasing the degree of the deterioration of the braking feeling of its brake generated by making the reference speed follow the wheel speed selected by the select-high.

Incidentally, the value of the default α is not limited to 0.5 shown in the present embodiment. By setting the value of the default α to be an appropriate value to every type of a car, improved operations and advantages of the present invention can be obtained. It can be considered that it is preferable to set the value of the default α to be an appropriated value by ascertaining the braking feeling of a brake by experiments or the like.

Next, a description is given to the relations between each of the above-mentioned wheel speeds and the reference speeds following it in a motorcycle equipped with an anti-lock braking system according to the present invention while comparing the state in which the lifting of its rear wheel has not occurred and the state in which the lifting of the rear wheel has occurred.

Figure 4:
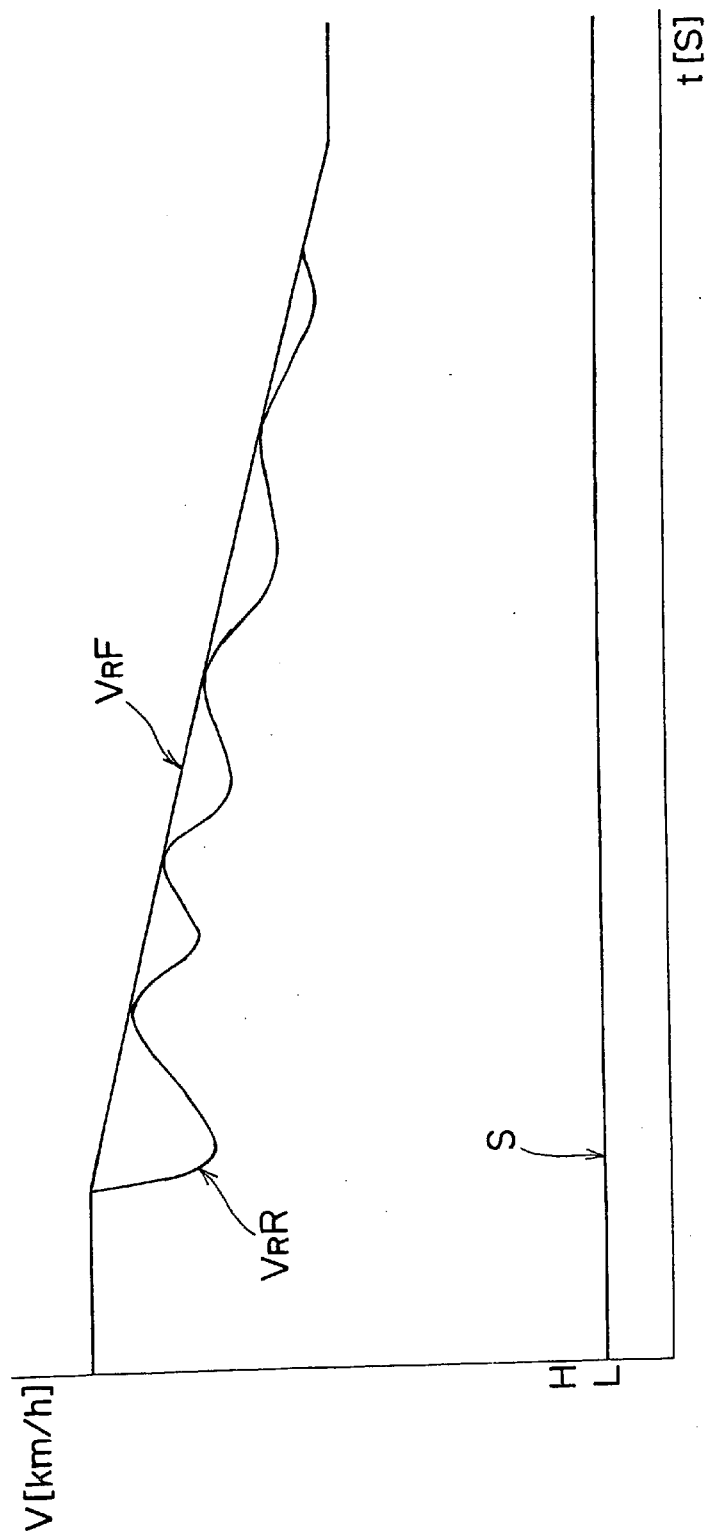
FIG. 4 is a graph showing relations between each wheel speed and a reference speed in the state in which the lifting of a rear wheel has not occurred in the case where only a rear wheel brake is operated in the motorcycle equipped with the anti-lock braking system according to the present invention.

FIG. 4 is a graph showing relations between each of the wheel speeds and a reference speed in the state in which the lifting of the rear wheel has not occurred in the case where only the rear wheel brake is operated in a motorcycle equipped with an anti-lock braking system according to the present invention.

Hereupon, a reference mark $V_RF$ designates a wheel speed of the front wheel, and a reference mark $V_RR$ designates a wheel speed of the rear wheel. Moreover, a rear wheel lifting state detection state S indicates the state in which the lifting of the rear wheel does not occur at its low level L, and indicates the state in which the lifting of the rear wheel has been detected at its high level H. The meaning of the indication is the same in the following.

FIG. 4 shows the state in which the motorcycle is trying to stop by operating only its rear wheel brake while driving on a high μ road surface, namely the state in which only anti-lock braking control of the rear wheel 231 is executed. Because the state is the one in which only the rear wheel brake is operated, it is natural that the lifting of the rear wheel does not occur and the anti-lock braking control of the front wheel is also not performed (No at Step S2 in FIG. 3). Consequently, a reference speed RS follows the fastest wheel speed $V_RH$, i.e. the front wheel wheel speed $V_RF$ in FIG. 4, (Step S4 in FIG. 3).

Figure 5:
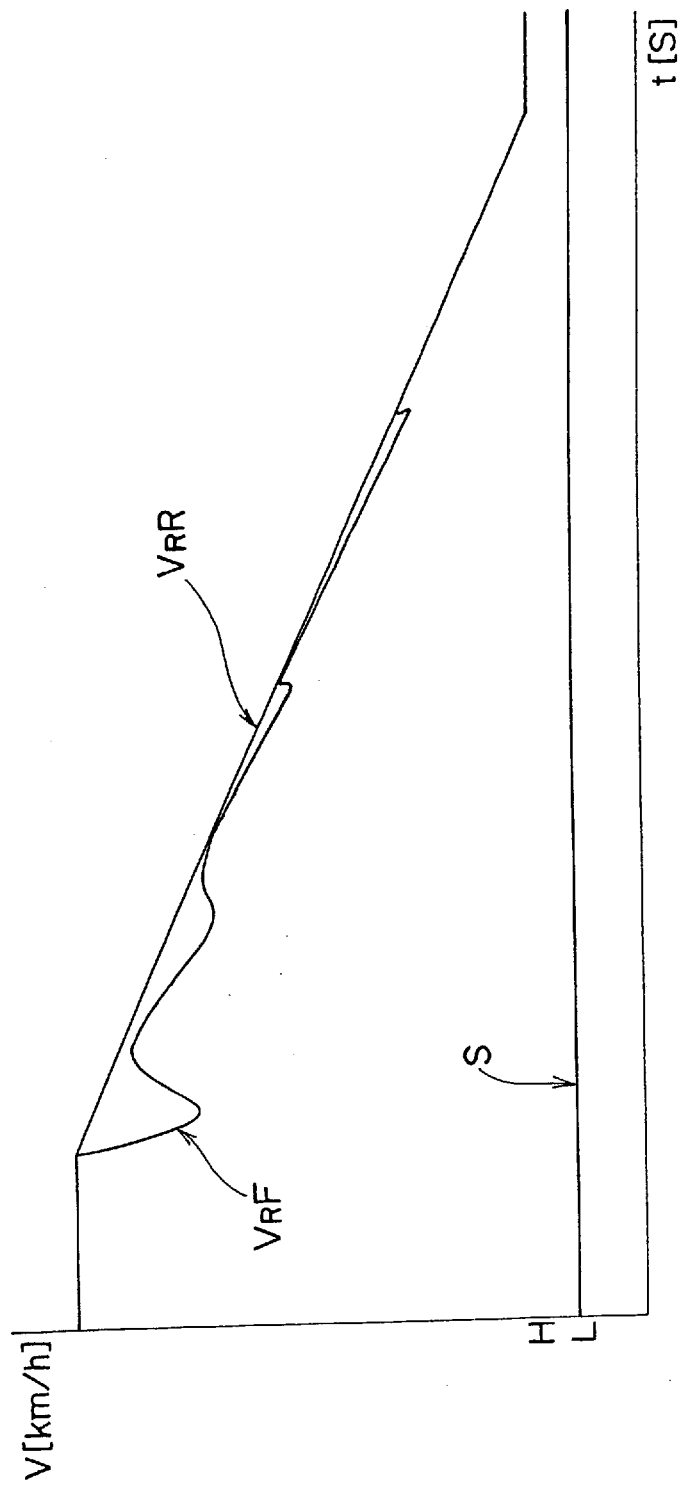
FIG. 5 is a graph showing relations between each wheel speed and the reference speed in the state in which the lifting of the rear wheel has not occurred in the case where only a front wheel brake is operated in the motorcycle equipped with the anti-lock braking system according to the present invention.

FIG. 5 is a graph showing relations between each of the wheel speeds and the reference speed in the state in which the lifting of the rear wheel has not occurred in the case where only the front wheel brake is operated in the motorcycle equipped with the anti-lock braking system according to the present invention.

FIG. 5 shows the state in which the motorcycle is trying to stop by operating only its front wheel brake while traveling on a high μ road surface, namely the state in which only the anti-lock braking control of the front wheel 131 is executed. Moreover, because its reference body deceleration value is less than −0.4 g (No at Step S3 in FIG. 3), it is considered that the lifting of the rear wheel 231 does not occur and the rear wheel lifting state detection state S keeps at the low level L from beginning to end. Consequently, the reference speed RS follows the fastest wheel speed $V_RH$, i.e. the rear wheel wheel speed $V_RR$ in FIG. 5, (Step S4 in FIG. 3).

Figure 6:
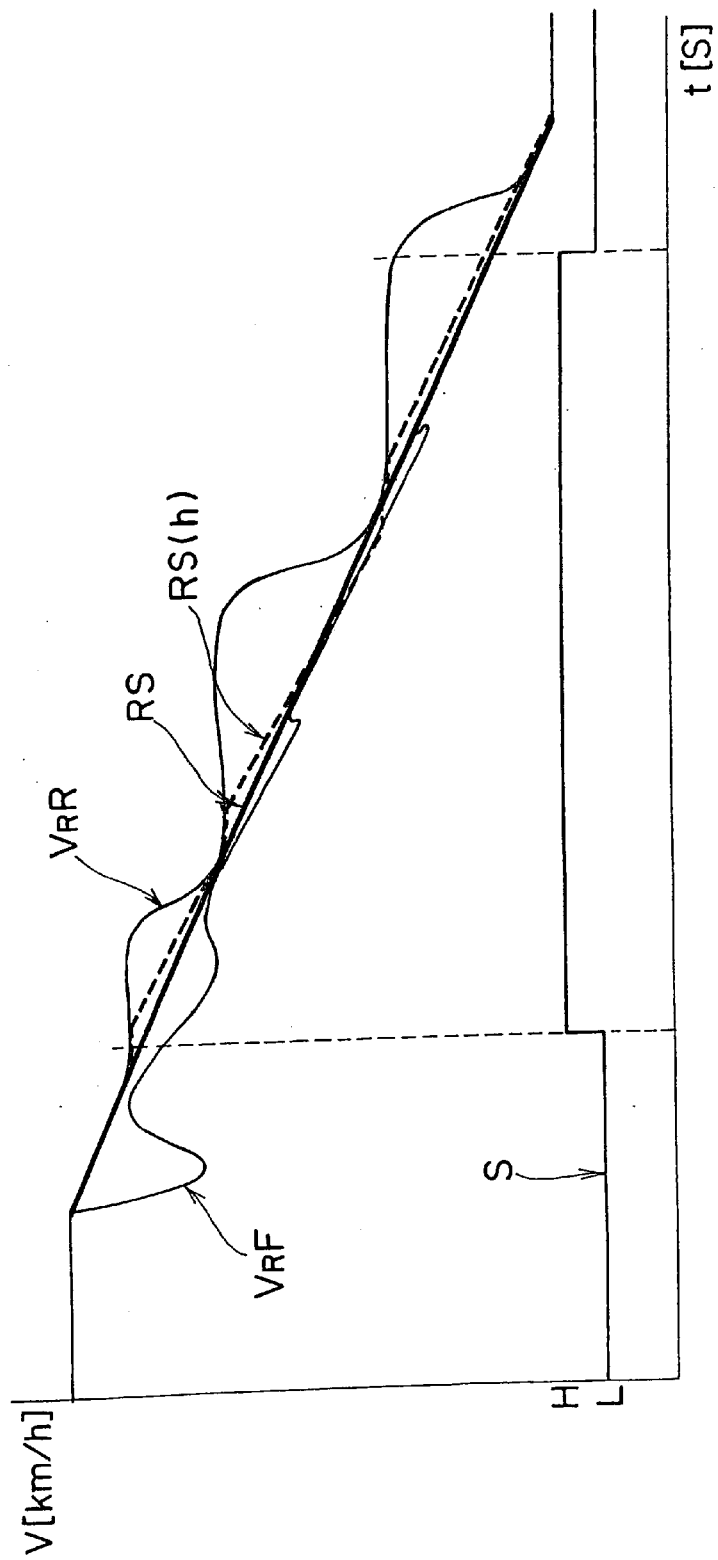
FIG. 6 is a graph showing relations between each wheel speed and reference speeds in the state in which the lifting of the rear wheel has occurred in the case where only the front wheel brake is operated in the motorcycle equipped with the anti-lock braking system according to the present invention.

FIG. 6 is a graph showing relations between each of the wheel speeds and the reference speeds in the state in which the lifting of the rear wheel 231 has occurred in the case where only the front wheel brake is operated in the motorcycle equipped with the anti-lock braking system according to the present invention.

FIG. 6 shows the state in which the motorcycle is trying to stop by operating only its front wheel brake while traveling on a high μ road surface, namely the state in which only anti-lock braking control of the front wheel 131 is executed. Moreover, because its reference body deceleration value is less than −0.4 g (No at Step S3 in FIG. 3) while the rear wheel lifting state detection state S keeps at the low level L, the possibility of the occurrence of the lifting of the rear wheel 231 is low during the period. Consequently, it is considered that the lifting of the rear wheel 231 has not occurred. Then the reference speed RS follows the fastest wheel speed $V_RH$, i.e. the rear wheel wheel speed $V_RR$ in FIG. 6, (Step S4 in FIG. 3).

On the other hand, while the rear wheel lifting state detection state S is at the high level H, the reference body deceleration is equal to −0.4 g or more (Yes at Step S3 in FIG. 3), and the possibility of the occurrence of the lifting of the rear wheel 231 is high. Consequently, it is considered that the lifting of the rear wheel 231 has occurred, and the reference speed RS follows the wheel speed $V_RM$ being a speed of right the middle between the wheel speed $V_RL$ and the wheel speed $V_RH$ (Step S5 in FIG. 3).

Hereupon, the reference speed RS in case of being made to follow the wheel speed $V_RM$ and a reference speed RS(h) in case of being made to follow the fastest wheel speed $V_RH$, or the rear wheel wheel speed $V_RR$ in FIG. 6, are compared with each other.

As described above, while the possibility of the occurrence of the lifting of the rear wheel 231 is high and the occurrence of the state of the lifting of the rear wheel 231 is presumed, the lifting of the rear wheel 231 removes the ground resistance to the rear wheel 231 to reduce the deceleration of the wheel speed of the rear wheel 231 rapidly. Consequently, if the anti-lock braking control is executed on the basis of the reference speed RS(h), the reference speed RS(h) becomes higher than the actual car body speed at the time of the lifting of the rear wheel 231.

On the contrary, by making the reference speed RS follow the wheel speed $V_RM$ being right in the middle speed between the wheel speed $V_RL$ and the wheel speed $V_RH$, namely by decreasing the wheel speed which the reference speed RS is made to follow, the reference speed RS being made to follow the wheel speed $V_RM$ becomes one lower than the reference speed RS(h). Consequently, because the reference speed RS being made to follow the wheel speed $V_RM$ is closer to the actual car body speed than the reference speed RS(h), the degree of the deterioration of the braking feeling of a brake that is generated by the situation in which the reference speed is higher than the actual car body speed can be reduced.

Figure 7:
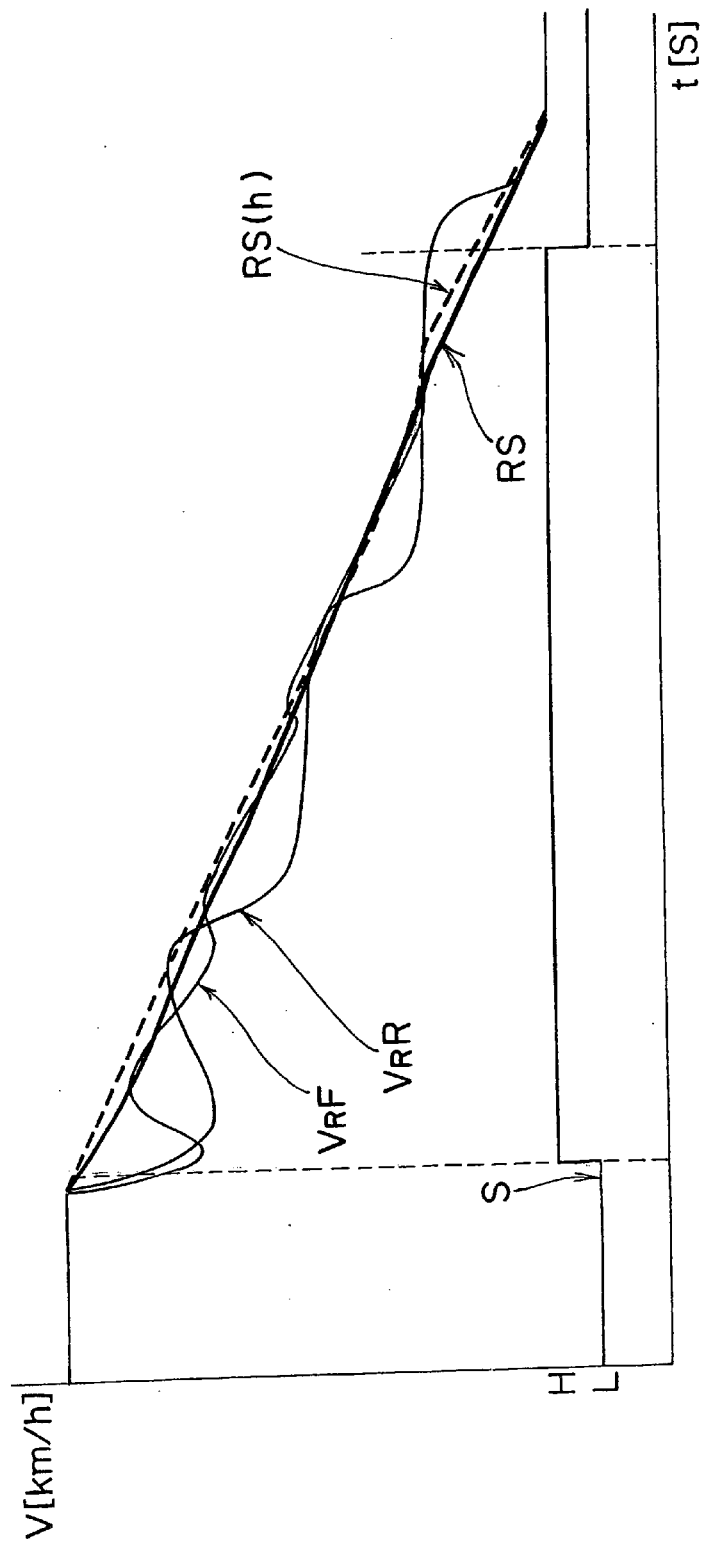
FIG. 7 is a graph showing relations between each wheel speed and the reference speeds in the state in which the lifting of the rear wheel has occurred in the case where both of the front wheel brake and the rear wheel brake are operated in the motorcycle equipped with the anti-lock braking system according to the present invention.

FIG. 7 is a graph showing relations between each of the wheel speeds and the reference speeds in the state in which the lifting of the rear wheel 231 has occurred in the case where both of the front wheel brake and the rear wheel brake are operated in the motorcycle equipped with the anti-lock braking system according to the present invention.

FIG. 7 shows the state in which the motorcycle is trying to stop by operating both of its front wheel brake and its rear wheel brake while traveling on a high μ road surface, namely the state in which the anti-lock braking control is executed to each of the front wheel 131 and the rear wheel 231, severally. As in the case shown in FIG. 6 where only the front wheel brake is operated, because its reference body deceleration is less than −0.4 g (No at Step S3 in FIG. 3) while the rear wheel lifting state detection state S is at the low level L, it is considered that the lifting of the rear wheel 231 has not occurred during the period of time. Then, the reference speed RS follows the fastest wheel speed $V_RH$, i.e. the rear wheel wheel speed $V_RR$ in FIG. 7, (Step S4 in FIG. 3).

On the other hand, while the rear wheel lifting state detection state S is at the high level H, the reference body deceleration is equal to −0.4 g or more (Yes at Step S3 in FIG. 3), and the provability of the occurrence of the lifting of the rear wheel 231 is high. Consequently, it is considered that the lifting of the rear wheel 231 has occurred, and the reference speed RS follows the wheel speed $V_RM$ being a speed of right the middle between the wheel speed $V_RL$ and the wheel speed $V_RH$ (Step S5 in FIG. 3).

In such a way, by making the reference speed RS follow the wheel speed $V_RM$ being the middle speed between the slowest wheel speed $V_RL$ and the fastest wheel speed $V_RH$, the reference speed RS can be made to be closer to the actual car body speed. Consequently, the deterioration of the braking feeling of a brake caused by making the reference speed follow the wheel speed selected by the select-high uniformly like in the conventional way can be reduced. Moreover, the probability of the decrease of the vehicle stability especially at the time of traveling on a low $\mu$ road surface, which decrease is generated in case of making the reference speed follow a wheel speed selected by the select-low at the time of the lifting of the rear wheel 231, can be reduced.

As another embodiment, an embodiment can be cited in which the value of the default $\alpha$ at the time of calculating the wheel speed $V_RM$ is made to be variable in addition to the other features of the above-mentioned embodiment.

By setting the value of the default $\alpha$ at the time of calculating the wheel speed $V_RM$ to be variable like above, it becomes possible to set the wheel speed $V_RM$, which the reference speed is made to follow, to the most suitable wheel speed always according to car body speeds or the state of each wheel under various brake control conditions.

Incidentally, the scope of the present invention is not limited to the above-mentioned embodiments, but various modifications can be made in the scoped of the claimed invention. Needless to say, these modifications are also included in the scope of the present invention.

What is claimed is:

1. A method for operating a reference speed in an anti-lock braking control of an automobile having two or more wheels, said method comprising the steps of:

supposing a wheel speed of a wheel rotating at a slowest rotational speed to be $V_RL$;

supposing a wheel speed of a wheel rotating at a fastest rotational speed to be $V_RH$;

supposing a fixed default to be $\alpha$; and operating said reference speed to follow a wheel speed $V_RM$ calculated in accordance with a following formula:

$$V_RM = \alpha V_RL + (1-\alpha)V_RH \ (0<\alpha<1).$$

2. An anti-lock braking control method of an automobile having two or more wheels, said method comprising the steps of:

supposing a wheel speed of a wheel rotating at a slowest rotational speed to be $V_RL$;

supposing a wheel speed of a wheel rotating at a fastest rotational speed to be $V_RH$;

supposing a fixed default to be $\alpha$; and operating said reference speed to follow a wheel speed $V_RM$ calculated in accordance with a following formula:

$$V_RM = \alpha V_RL + (1-\alpha)V_RH \ (0<\alpha<1).$$

3. The anti-lock braking control method according to claim 2, said method further comprising the steps of:

operating said reference speed to follow the wheel speed $V_RH$ during an anti-lock braking control;

noticing reference body deceleration calculated on a basis of said reference speed to judge that lifting of a rear wheel from a supporting surface has occurred if the reference body deceleration is equal to a predetermined value or more during said anti-lock braking control of a front wheel; and operating said reference speed to follow the wheel speed $V_RM$ at a time of the lifting of the rear wheel.

4. The anti-lock braking control method according to claim 2, wherein a value of the default $\alpha$ is variable according to a state of the anti-lock braking control.

5. The anti-lock braking control method according to claim 2, wherein said reference speed is operated to follow a wheel speed of an undriven wheel while said anti-lock braking control is not executed.

6. An anti-lock braking system of an automobile having two or more wheels, said automobile being equipped with wheel speed sensors generating rotational speed information of said wheels and an ECU including means for calculating wheel speeds on a basis of the rotational speed information of said wheels input from said wheel speed sensors to operate a reference speed on a basis of the wheel speeds for operating slip ratios and acceleration and deceleration of said wheels on a basis of said reference speed, wherein said ECU includes means for operating said reference speed to follow a wheel speed $V_RM$ calculated in accordance with a following formula by supposing a wheel speed of a wheel rotating at a slowest rotational speed to be $V_RL$, and supposing a wheel speed of a wheel rotating at a fastest rotational speed to be $V_RH$, and further supposing a fixed default to be $\alpha$:

$$V_RM = \alpha V_RL + (1-\alpha)V_RH \ (0<\alpha<1).$$

7. The anti-lock braking system according to claim 6, wherein said ECU operates said reference speed to follow the wheel speed $V_RH$ during an anti-lock braking control, and said ECU notices reference body deceleration calculated on a basis of said reference speed to judge that lifting of a rear wheel from a supporting surface has occurred if the reference body deceleration is equal to a predetermined value or more during said anti-lock braking control of a front wheel, and further said ECU operates said reference speed to follow the wheel speed $V_RM$ at a time of the lifting of the rear wheel.

8. The anti-lock braking system according to claim 6, wherein a value of the default $\alpha$ is variable according to a state of the anti-lock braking control.

9. The anti-lock braking system according to claim 6, wherein said ECU operates said reference speed to follow a wheel speed of an undriven wheel while said anti-lock braking control is not executed.

* * * * *